3,016,373
PROCESS FOR THE PREPARATION OF
DIBENZ[b,f]AZEPINES
Andrew J. Saggiomo, Philadelphia, and Joseph Weinstock, Phoenixville, Pa., assignors to Smith Kline & French Laboratories, Philadelphia, Pa., a corporation of Pennsylvania
No Drawing. Filed Feb. 17, 1960, Ser. No. 9,191
6 Claims. (Cl. 260—239)

This invention relates to a process for the preparation of 5H-dibenzyl[b,f]azepines and 10,11-dihydro-5H-dibenz-[b,f]azepines.

The dibenz[b,f]azepine derivatives prepared in accordance with this invention are useful as intermediates in the preparation of 5-dialkylaminoalkyl - 5H-dibenz[b,f]-azepines and the corresponding 10,11-dihydro derivatives. These 5-dialkylaminoalkyl compounds have useful therapeutic activity, specifically as antiemetics, tranquilizers, calmatives, antihistaminics, spasmolytics, antishock agents, antidepressants and potentiators of analgetics or anesthetics.

The novel process of this invention is schematically represented as follows:

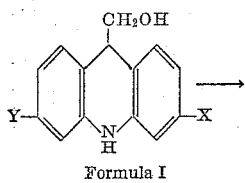

Formula I

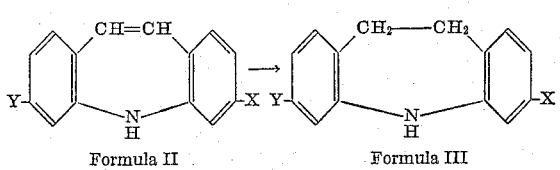

Formula II      Formula III when X and Y represent hydrogen, chlorine or trifluoromethyl. Preferably X represents chlorine or trifluoromethyl and Y represents hydrogen.

The 9-acridanemethanol starting materials of Formula I are prepared from the corresponding 9-chloroacridines. For example, 3,9-dichloroacridine is converted in a pressure reactor to 3-chloro-9-cyanoacridine with alcoholic sodium cyanide. Hydrolysis of the cyano derivative with sulfuric acid and treatment of the acid amide with nitrous acid gives 3-chloro-9-acridinecarboxylic acid. The acid is reacted with an excess of thionyl chloride and the resulting acid chloride is esterified with ethanol to give ethyl 3-chloro-9-acridinecarboxylate. Reduction of the ester with lithium aluminum hydride yields the 3-chloro-9-acridanemethanol.

Another example of the preparation of a 9-acridanemethanol starting material is as follows. 3-trifluoromethyl-9-chloroacridine is reacted with sodium diethylmalonate and then hydrolyzed with mineral acid to give 3-trifluoromethyl-9-methylacridine. The latter compound is also prepared by the Bernthsen reaction of 3-trifluoromethyldiphenylamine and acetic anhydride in the presence of zinc chloride. Bromination of 3-trifluoromethyl-9-methylacridine with N-bromosuccinimide in the presence of benzoyl peroxide gives 3-trifluoromethyl-9-bromomethyl-acridine which is heated with alcoholic potassium acetate to give the corresponding acetoxymethyl derivative. Reduction of the acetoxy derivative with lithium aluminum hydride yields the 3-trifluoromethyl-9-acridanemethanol.

In accordance with the novel process of this invention as shown above, the substituted 9-acridanemethanol of Formula I is dehydrated to give the corresponding dibenz-[b,f]-azepine of Formula II. Advantageously the 9-acridanemethanol derivative is heated in a suitable nonreactive organic solvent such as xylene or chlorobenzene in the presence of phosphorus pentoxide at a temperature in the range of from about 125 to 175° C. for from one to six hours. Preferably the 9-acridanemethanol is heated in xylene with phosphorus pentoxide at reflux temperature for 2–3 hours. Addition of water to the cooled reaction mixture followed by evaporation of the organic layer yields the dibenz[b,f]azepine derivative. This compound is then reduced to the 10,11-dihydro-dibenz[b,f]azepine of Formula III by catalytic hydrogenation. Exemplary of suitable hydrogenation catalysts are those of platinum and palladium, preferably used in the form of platinum oxide or a combination of palladium with a carrier such as charcoal. Advantageously the dibenz[b,f]azepine is hydrogenated in a lower alkanol solution such as methanol or ethanol with platinum oxide at atmospheric pressure and ambient or room temperature, about 25° C. Elevated temperatures, for example up to 50° C., may be employed but with no particular advantage. The dihydro product is isolated by evaporation of the solvent and chromatography of the residue and further purified by recrystallization.

It is obvious from the above description that the novel process of this invention affords an advantageous route to 5H-dibenz[b,f]azepines and 10,11 - dihydro-5H-dibenz-[b,f]azepines, particularly the mono substituted derivatives thereof. The step in the process whereby the 9-acridanemethanol is dehydrated to form the 5H-dibenz[b,f]azepine of Formula II is particularly novel and advantageous.

The definition of the nuclear substituents in the formulae described hereinabove has been limited for purposes of simplification, but other obvious substituents could be included therein. Thus, 9-acridanemethanols of Formula I when X and Y represent other halogens such as bromo or fluoro, lower alkyl groups such as methyl, lower alkoxy groups such as methoxy or lower acyl groups such as acetyl could be employed in this process to give the corresponding dibenz[b,f]azepines.

The 5H-dibenz[b,f]azepines and the corresponding 10,11-dihydro derivatives prepared in accordance with the process of this invention are used as intermediates to prepare the 5-dialkylaminoalkyl therapeutic products as follows:

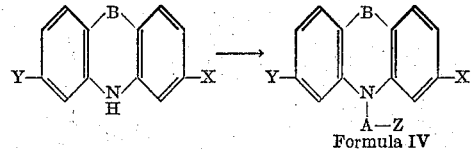

Formula IV when B represents $CH_2CH_2$ or $CH=CH$;

X and Y represent hydrogen, chlorine or trifluoromethyl;

A represents a divalent, straight or branched lower alkylene chain, preferably containing 2 to 4 carbon atoms, separating the N and Z moiety by at least 2 carbons; and Z represents amino, monoalkylamino, dialkylamino, pyrrolidinyl, N-hydrogenpiperazinyl, N-alkylpiperazinyl, N - hydroxyalkylenepiperazinyl, N-alkanoyloxyalkylene-piperazinyl, N-benzoyloxyalkylenepiperazinyl, N-dialkylaminoalkylenepiperazinyl, N - hydroxyalkyleneoxyalkyl-enepiperazinyl, N-alkanoyloxyalkyleneoxyalkylenepipera-zinyl, N-benzoyloxyalkyleneoxyalkylenepiperazinyl, N-hydroxyethoxyethoxyethylpiperazinyl or N-phenylalkylpiperazinyl; each of the said alkyl moieties having 1 to 6 carbon atoms and each of the said alkanoyl and alkylene moieties having 2 to 6 carbon atoms. As shown above, the dibenzazepine intermediates are alkylated with any reactive dialkylaminoalkyl ester containing the desired —A—Z moiety such as a halide, preferably chloride or bromide, or an aryl sulfonate, preferably p-toluene sulfonate. The reaction is carried out advantageously by refluxing the reactants in a suitable inert aromatic solvent such as, preferably, benzene, toluene or xylene, in which at least one of the reactants must be soluble. A suitable acid-binding agent is usually included, such as an alkali metal amide, preferably sodium, potassium or lithium amide. Other suitable acid-binding agents are alkali metal hydrides, preferably sodium hydride or alkali metal aryl or alkyl compounds, preferably phenyl or octyl sodium. If an acid addition salt of the reactive dialkylaminoalkyl ester is used, a corresponding increase in the amount of acid-binding agent must be used.

The substituted 5-dialkylaminoalkyl dibenzazepine derivative is isolated by cooling the reaction mixture and carefully adding an excess of water. The organic layers are extracted with dilute acid, preferably dilute hydrochloric acid. The acid extracts are combined, neutralized with dilute base and extracted with benzene. The dried benzene extracts are evaporated and the resulting residue is optionally fractionally distilled under high vacuum or purified by a chromatographic procedure to give the desired base. In practice, the basic oil is usually dissolved in an organic solvent and converted into a stable salt by reacting the solution with a suitable organic or inorganic acid.

The substituted 5-($\omega$-piperazinylalkyl)-dibenzazepines are prepared advantageously by alkylating the dibenzazepine with an $\omega$-haloalkylpiperazine having the free N-hydrogen of the piperazinyl moiety replaced by an easily removed moiety, for example, a benzyl, carbobenzoxy, or acyl, preferably formyl group. The N-protective group is then removed under mild conditions, such as by weakly alkaline hydrolysis in the case of the preferred formyl group. The resulting substituted 5-($\omega$-piperazinylalkyl)-dibenzazepine derivative is then further alkylated to form the various N-substituted piperazinyl compounds represented in Formula IV. Such methods of alkylation are by a reactive ester such as an alkyl halide in the presence of an acid-binding agent as described above in an inert solvent such as benzene or xylene or by reaction with an alkylene oxide such as ethylene oxide in a lower alcohol. In addition, substituted 5-(N'-alkyl-N-piperazinylalkyl)-dibenzazepines having a terminal group on the N'-alkyl moiety capable of undergoing reaction, such as $\omega$-hydroxy-alkyl, are optionally reacted with an acyl halide in the presence of an acid-binding agent to give, for example, N'-acyloxyalkyl derivatives of substituted 5-($\omega$-piperazinylalkyl)-dibenzazepines.

The foregoing is a general description of the novel process for the preparation of 5H-dibenz[b,f]azapines and 10,11-dihydro-5H-dibenz[b,f]azepines. It will be apparent to one skilled in the art that certain modifications of the process can be made which would still fall under the overall basic reaction sequence as described herein. For example, the nitrogen atom of the acridanemethanol could be (1) acylated with for example an acetyl moiety which would be removed by hydrolysis after the dehydration step or (2) alkylated with a reactive ester such as a halide containing the desired —A—Z moiety defined in Formula IV to give the dibenzazepine product directly upon dehydration.

The following examples are not limiting but illustrative of the process of this invention and of the compounds advantageously prepared thereby.

*Example 1*

Into a stainless steel pressure reactor is placed a mixture of 53.5 g. of 3,9-dichloracridine, 12.0 g. of sodium cyanide and 375 ml. of anhydrous methanol. Pre-purified nitrogen is introduced (1 atmosphere) and the reactor is heated at 130–140° C. for 4.5 hrs., with continuous rocking. The reactor is cooled, vented and the product removed with acetone. The solid is filtered, water-washed and recrystallized from methanol to give 3-chloro-9-cyanoacridine, M.P. 202.5° C.

A mixture of 135 g. of 3-chloro-9-cyanoacridine and 700 ml. of 90% sulfuric acid is heated in a boiling water bath for three hours with stirring. The reaction mixture is cooled to 0° C. and 210 g. of sodium nitrite is added portionwise. The suspension is allowed to stand one hour at 0–5° C. and an additional hour at room temperature. The reaction mixture is gradually heated by a water bath to 55–60° C., when a vigorous evolution of gas occurs. When the latter subsides, the mixture is heated two hours on a boiling water bath, cooled to 0° C. and is diluted with ice water, dissolved in dilute sodium hydroxide and the solution decolorized with charcoal. Acidification of the filtrate gives 3-chloro-9-acridinecarboxylic acid, M.P. 268° C. (dec.).

A mixture of the above acid (128 g.) and 405 g. of thionyl chloride is refluxed with stirring until all the acid is dissolved (3–4 hours). The solution is cooled and diluted with benzene. The precipitate is washed with benzene and then added in portions to 800 ml. of ethanol. The mixture is gradually heated and refluxed for two hours. The cooled solution is diluted with water and made alkaline with a cold solution of sodium carbonate. The solid is water-washed and recrystallized from hexane to give ethyl 3-chloro-9-acridinecarboxylate, M.P. 96–96.5° C.

To 300 ml. of anhydrous ether is added 28.0 g. of lithium aluminum hydride in portions and the mixture heated at reflux for 30 minutes. To the stirred suspension at room temperature under an atmosphere of nitrogen is added dropwise a solution of 100 g. of ethyl 3-chloro-9-acridinecarboxylate in 1500 ml. of anhydrous ether. After two thirds of the addition is completed, an additional 10.0 g. of lithium aluminum hydride is added and refluxing is continued for three hours. The mixture is cooled to 0° C. and slowly decomposed with wet ether, followed by an excess of water. The separated aqueous layer is acidified with dilute hydrochloric acid and extracted with ether. The dried ether extract is evaporated in vacuo to yield 3-chloro-9-acridanemethanol, M.P. 139–140° C. upon recrystallization from benzene-petroleum ether.

A mixture of 1.0 g. of 3-chloro-9-acridanemethanol and 10 g. of reagent sea sand is stirred in 30 ml. of refluxing pre-dried xylene under nitrogen. To this is added in four portions over a two hour period 4.0 g. of phosphorus pentoxide and the resulting mixture is refluxed for an additional 90 minutes. The cooled reaction mixture is cautiously treated with a large excess of water, filtered and the aqueous layer and sand are separately extracted with hot benzene. The benzene extracts and xylene layer are combined, dried and the solvent removed in vacuo. The residue is recrystallized from benzene to give 3-chloro-5H-dibenz[b,f]azepine, M.P. 208–209° C.

*Example 2*

A mixture of 2.28 g. of 3-chloro-5H-dibenz[b,f]azepine (prepared as in Example 1), 100 mg. of platinum oxide and 100 ml. of ethanol is hydrogenated at atmospheric pressure and room temperature. When the reaction mixture assumes a pale yellow color (120–130% hydrogen absorption), hydrogenation is discontinued, the catalyst filtered and the filtrate evaporated in vacuo. The residue is dissolved in 10 ml. of benzene and the solution chromatographed on an alumina column. The column is eluted with 100 ml. of 50% benzene in low boiling petroleum ether. The first fraction (colorless) is concentrated in vacuo and the impurities are removed from the resulting residue by recrystallization and sublimation. The solid which does not sublime is recrystallized from aqueous ethanol to give 3-chloro-10,11-dihydro-5H-dibenz[b,f]azepine, M.P. 84.5–86° C.

*Example 3*

A solution of 13.0 g. of sodium in 1300 ml. of anhydrous absolute ethanol is treated with 160 g. of ethyl malonate fairly rapidly and the resulting solution is allowed to remain at room temperature for one hour. A warm solution of 141 g. of 3-trifluoromethyl-9-chloroacridine in 1300 ml. of toluene is then added rapidly. The mixture is refluxed for 20 hours. Most of the solvent is removed by atmospheric distillation and the residue is refluxed for ten hours with a solution of 500 ml. of hydrochloric acid in 500 ml. of water. The mixture is filtered and the filtrate is made basic in the cold to precipitate a solid. Recrystallization from benzene-petroleum ether gives 3-trifluoromethyl-9-methylacridine, M.P. 118–119.5° C.

Alternatively, a mixture of 9.48 g. of 3-trifluoromethyl-diphenylamine, 5.0 g. of acetic anhydride and 6.0 g. of fused zinc chloride is stirred under nitrogen in an oil bath at 160–180° C. for seven hours. The cooled mixture is heated with 20% hydrochloric acid, filtered and the filtrate is made basic with concentrated ammonium hydroxide. The resulting solid is water-washed and dried to give the same 3-trifluoromethyl-9-methylacridine as obtained above.

A mixture of 99 g. of 3-trifluoromethyl-9-methylacridine, 71.2 g. of N-bromosuccinimide and 3.8 g. of benzoyl peroxide is stirred in refluxing carbon tetrachloride (1500 ml.) for 20 hours. The cooled reaction mixture is filtered and the filtrate concentrated. The hot solution is diluted with petroleum ether and cooled to give 3-trifluoromethyl-9-bromomethylacridine, M.P. 127–128.5° C.

To a stirred solution of 102 g. of the above bromomethylacridine in 800 ml. of absolute ethanol at room temperature is added a solution of anhydrous potassium acetate (30.5 g.) in 500 ml. of absolute ethanol. The mixture is heated to reflux and maintained for four hours. During the last hour, approximately one half of the solvent is distilled from the reaction mixture. Cooling gives 3-trifluoromethyl-9-acetoxymethylacridine, M.P. 128–129° C.

To a solution of 13.0 g. of lithium aluminum hydride in 600 ml. of anhydrous ether is added dropwise a solution of 68.0 g. of 3-trifluoromethyl-9-acetoxymethylacridine in 1500 ml. of anhydrous ether. The mixture is refluxed for three and one-half hours, cooled to 0° C. and then decomposed with wet ether followed by an excess of water. The aqueous layer is separated and extracted with ether. The combined ether solutions are dried and evaporated to yield 3-trifluoromethyl-9-acridanemethanol, M.P. 141–142.5° C.

To a solution of 13.0 g. of 3-trifluoromethyl-9-acridanemethanol in 150 ml. of refluxing xylene under nitrogen is added at 15 minute intervals six teaspoonfuls of phosphoric anhydride. The mixture is refluxed for one-half hour, cooled and then cautiously treated with a large excess of water, followed by sodium bicarbonate solution. The separated aqueous layer is extracted with warm xylene and the combined xylene solutions are dried and evaporated in vacuo to give 3-trifluoromethyl-5H-dibenz[b,f]azepine, M.P. 180.181.5° C.

Example 4

A mixture of 3.0 g. of 3-trifluoromethyl-5H-dibenz[b,f]azepine and 100 mg. of platinum oxide in 100 ml. of ethanol is hydrogenated following the procedure outlined in Example 2. Workup of the reaction mixture followed by chromatographic purification of the residue yields the corresponding 3-trifluoromethyl-10,11-dihydro-5H-dibenz[b,f]azepine.

Example 5

A stirred mixture of 5.0 g. of phosphorus pentoxide, 125 ml. of xylene and glass beads under nitrogen is heated to reflux. To this mixture is added 2.0 g. of 9-acridanemethanol via the Soxhlet extraction method. After two hours the reaction is cooled and quenched with water. The aqueous layer is shaken with hot xylene and the combined xylene layers dried and concentrated by distillation. The residue is recrystallized from benzene-petroleum ether to give 5H-dibenz[b,f]azepine, M.P. 195.5–196.5° C.

Example 6

A solution of 6.0 g. of sodium in 600 ml. of anhydrous absolute ethanol is heated with 80 g. of ethyl malonate and then allowed to remain at room temperature for one hour. A solution of 79.0 g. of 3-trifluoromethyl-6,9-dichloroacridine in 600 ml. of warm toluene is added rapidly and the mixture refluxed for 20 hours. The solvent is removed and the residue is refluxed for ten hours with 500 ml. of dilute hydrochloric acid (1:1). The reaction mixture is filtered and the filtrate made basic to give 6-chloro-9-methyl-3-trifluoromethylacridine.

A mixture of 59.6 g. of the above prepared 9-methylacridine, 36.0 g. of N-bromosuccinimide and 2.0 g. of benzoyl peroxide is stirred in 750 ml. of carbon tetrachloride for 20 hours. The cooled, filtered reaction mixture is concentrated and diluted with petroleum ether to give 9-bromomethyl-6-chloro-3-trifluoromethylacridine. This latter compound (37.5 g.) is dissolved in 250 ml. of absolute ethanol and treated with 10.1 g. of anhydrous potassium acetate in 150 ml. of ethanol. The mixture is refluxed for four hours and then concentrated and cooled to give 9-acetoxymethyl-6-chloro - 3 - trifluoromethylacridine. The acetoxymethylacridine (20.0 g.) is then reduced with lithium aluminum hydride as described in Example 3 to yield 6-chloro-3-trifluoromethyl-9-acridanemethanol.

A mixture of 2.0 g. of 6-chloro-3-trifluoromethyl-9-acridanemethanol in 75 ml. of xylene and 7.0 g. of phosphoric anhydride is refluxed for one-half hour, cooled and then treated with an excess of water, followed by sodium bicarbonate solution. The aqueous layer is extracted with warm xylene. The combined xylene solutions are dried and evaporated in vacuo to give 7-chloro-3-trifluoromethyl-5H-dibenz[b,f]azepine.

Example 7

A solution of 5.0 g. of 3-chloro-5H-dibenz[b,f]azepine in 200 ml. of hot toluene is added to a suspension of 2.0 g. of sodamide in 100 ml. of toluene and the mixture refluxed for two hours. A solution of 5.5 g. of dimethylaminopropyl chloride in 50 ml. of toluene is added and the mixture refluxed for 17 hours. The cooled reaction mixture is treated with 125 ml. of water and stirred for 20 minutes. The separated toluene layer is extracted with dilute hydrochloric acid and the acid extract made basic with 40% sodium hydroxide solution. The alkaline solution is extracted with benzene and the benzene subsequently evaporated. The residue is distilled under reduced pressure to give 3-chloro-5-(3'-dimethylaminopropyl)-5H-dibenz[b,f]azepine, B.P. 168–176° C. at 0.4–0.5 mm.

A sample of the free base in ethyl acetate solution is treated with maleic acid to give the corresponding maleate salt, M.P. 124.5–125.5° C.

Example 8

A suspension of 13.2 g. of 3-trifluoromethyl-10,11-dihydro-5H-dibenz[b,f]azepine and 3.0 g. of sodamide in 150 ml. of xylene is heated at reflux for one hour with stirring. A solution of 9.7 g. of 1-(3'-chloropropyl)-4-methylpiperazine in 50 ml. of xylene is added and the mixture refluxed for six hours. The cooled reaction mixture is worked up as described in Example 7 to yield 3-trifluoromethyl-5-[3'-(4''-methyl-1''-piperazinyl) - propyl]-10,11-dihydro-5H-dibenz[b,f]azepine.

What is claimed is:

1. The method of forming 10,11-dihydro-5H-dibenz[b,f]azepines having the following formula:

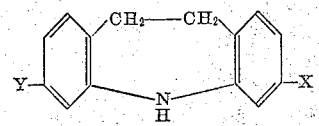

in which X and Y are members selected from the group consisting of hydrogen, chlorine and trifluoromethyl, which comprises dehydrating with phosphorus pentoxide a 9-acridanemethanol having the following formula:

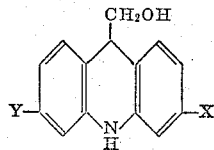

in which X and Y are as defined above to form a 5H-dibenz[b,f]azepine having the following formula:

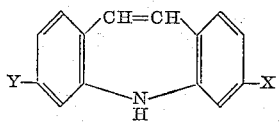

in which X and Y are as defined above and hydrogenating said 5H-dibenz[b,f]azepine in the presence of a hydrogenation catalyst selected from the group consisting of platinum and palladium catalysts.

2. The method of claim 1 characterized in that X is chlorine and Y is hydrogen.

3. The method of claim 1 characterized in that X is trifluoromethyl and Y is hydrogen.

4. The method of forming 5H-dibenz[b,f]azepines having the following formula:

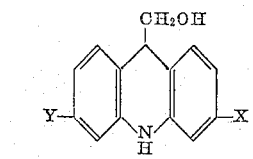

in which X and Y are members selected from the group consisting of hydrogen, chlorine and trifluoromethyl, which comprises dehydrating with phosphorus pentoxide a 9-acridanemethanol having the following formula:

CH₂OH in which X and Y are as defined above.

5. The method of claim 4 characterized in that X is chlorine and Y is hydrogen.

6. The method of claim 4 characterized in that X is trifluoromethyl and Y is hydrogen.

References Cited in the file of this patent

UNITED STATES PATENTS

| | | |
|---|---|---|
| 2,554,736 | Haefliger et al. | May 29, 1951 |
| 2,674,596 | Hafliger et al. | Apr. 6, 1954 |
| 2,830,990 | Struve | Apr. 15, 1958 |
| 2,915,523 | Moore et al. | Dec. 1, 1959 |

OTHER REFERENCES

Chemical Abstracts, vol. 31, p. 5803 (1937).